US009784866B2

(12) United States Patent
Brune

(10) Patent No.: US 9,784,866 B2
(45) Date of Patent: Oct. 10, 2017

(54) METHOD AND APPARATUS FOR ENHANCED MONITORING OF INDUCED SEISMICITY AND VIBRATION USING LINEAR LOW FREQUENCY AND ROTATIONAL SENSORS

(71) Applicant: Geokinetics USA, Inc., Houston, TX (US)

(72) Inventor: Robert H. Brune, Evergreen, CO (US)

(73) Assignee: Geokinetics USA, Inc., Houston, TX (US)

( * ) Notice: Subject to any disclaimer, the term of this patent is extended or adjusted under 35 U.S.C. 154(b) by 429 days.

(21) Appl. No.: 14/444,266

(22) Filed: Jul. 28, 2014

(65) Prior Publication Data

US 2015/0029822 A1 Jan. 29, 2015

Related U.S. Application Data

(60) Provisional application No. 61/859,277, filed on Jul. 28, 2013.

(51) Int. Cl.
*G01V 1/30* (2006.01)
*G01V 1/34* (2006.01)

(52) U.S. Cl.
CPC .............. *G01V 1/345* (2013.01); *G01V 1/30* (2013.01); *G01V 2210/74* (2013.01)

(58) Field of Classification Search
CPC ............ G01V 1/18; G01V 1/40; G01V 1/345; G01V 2210/74
USPC ....................................................... 367/14
See application file for complete search history.

(56) References Cited

U.S. PATENT DOCUMENTS

| 2,657,373 A | 10/1953 | Piety |
| 3,407,305 A | 10/1968 | Sterry |
| 4,038,876 A * | 8/1977 | Morris ................. G05D 1/0875 33/328 |
| 4,446,541 A | 5/1984 | Cowles |
| 4,603,407 A | 7/1986 | Cowles |

(Continued)

OTHER PUBLICATIONS

Alcudia, A., et al., Vibration and air pressure monitoring of seismic sources: CREWES Research Report, vol. 19, 2007, U. of Calgary.

(Continued)

*Primary Examiner* — Ian J Lobo
(74) *Attorney, Agent, or Firm* — Karen B. Tripp; Michael Reilly

(57) ABSTRACT

The present invention provides a method and apparatus for enhanced monitoring of induced seismicity and industrial vibration to comprehensively measure all aspects of potentially damaging motion. The invention utilizes various combinations of multi-component low frequency linear seismic sensors and multi-component rotational seismic sensors. Sensors are jointly deployed in arrays on the free surface of the earth, and/or in arrays of shallow monitoring holes, which may be intended to be permanent deployments. The method has a wide range of risk/damage monitoring applications for industrial activity, and in oil and gas exploration and production for seismic surveys, hydraulic fracturing, and waste injection wells. This abstract is not intended to be used to interpret or limit the claims of this invention.

20 Claims, 3 Drawing Sheets

(56) References Cited

U.S. PATENT DOCUMENTS

| | | | | |
|---|---|---|---|---|
| 5,430,953 | A | * | 7/1995 | de Souza ................ G01B 5/30 33/1 PT |
| 6,791,901 | B1 | * | 9/2004 | Robertsson ............ G01V 1/003 181/110 |
| 7,474,591 | B2 | | 1/2009 | Menard et al. |
| 7,516,660 | B2 | | 4/2009 | Kozlov et al. |
| 2005/0257616 | A1 | * | 11/2005 | Kozlov ................ G01P 15/006 73/514.16 |
| 2006/0245300 | A1 | * | 11/2006 | De Kok ................ G01V 1/38 367/15 |
| 2009/0185448 | A1 | * | 7/2009 | Duncan ................ G01V 1/366 367/40 |
| 2009/0238040 | A1 | * | 9/2009 | Duncan ................ G01V 1/366 367/38 |
| 2012/0250460 | A1 | * | 10/2012 | Edme ................ G01V 1/364 367/45 |

OTHER PUBLICATIONS

Baig, A., T., et al., Hydraulic Fractures Induce Events Large Enough to be Felt on Surface?, Canadian Society of Exploration Geophysicists (CSEG) Recorder, Oct. 2012, pp. 41-46.

Bouchon, M., and K. Aki, Strain, Tilt, and Rotation Associated with Strong Ground Motion in the Vicinity of Earthquake Faults, Bulletin of the Seismological Society of America, Oct. 1982, vol. 72, No. 5, pp. 1717-1738.

Das, I., and M. Zobak, Long-period, long-duration seismic events during hydraulic fracture stimulation of a shale gas reservoir, The Leading Edge, Jul. 2011, pp. 778-786.

Das, I., and M. Zobak, Microearthquakes Associated with Long Period, Long Duration Seismic Events During Stimulation of a Shale Gas Reservoir, presented at Society of Exploration Geophysicists annual meeting, Las Vegas, Nov. 4-9, 2012.

Duncan, P. and L. Eisner, Reservoir characterization using surface microseismic monitoring, 2010, Geophysics, vol. 75, No. 5, pp. 75A139-75A146.

Eaton, D., et al., Broadband microseismic observations from a Montney hydraulic treatment, northeastern B.C., Canada: CSEG Recorder, Mar. 2013, pp. 44-53.

ENTEC Model R-1; Jun. 2010; Entec_R-1_data_new.PDF.

Guidotti, R., Near Field Earthquake Ground Motion Rotations and Relevance on Civil Engineering Structures. Doctoral Dissertion, 2012, Politecnico di Milano.

Holland, A., Earthquakes triggered by Hydraulic Fracturing in South-Central Oklahoma, Bulletin of the Seismological Society of America, Jun. 2013, vol. 103, No. 3, pp. 1784-1792.

Horton, S., Disposal of Hydrofracking Waste Fluid by Injection into Subsurface Aquifers Triggers Earthquake Swarm in Central Arkansas with Potential for Damaging Earthquakes: Seismological Research Letters, vol. 83, No. 2, Mar./Apr. 2012.

Igel, H. et al., Ground rotations: what do they tell us, that we did not know before?: European Seismological Commission meeting, 2010, Montpellier, France, Sep. 6-10.

Kozak, J., Tutorial on Earthquake Rotational Effects: Historical Examples: in Lee, W., et. al, editors, Rotational Seismology and Engineering Applications: Bulletin of the Seismological Society of America, 2009, vol. 99, No. 2B supplement.

Lee, W., M. Celebi, M. Todorovska, and H. Igel, guest editors, Rotational Seismology and Engineering Applications: Bulletin of the Seismological Society of America, 2009, vol. 99, No. 2B supplement.

Lee, W., H. Igel, and M. Trifunac, Recent Advances in Rotational Seismology: Seismological Research Letters, 2009, vol. 80, No. 3, pp. 479-490, May/June.

McGarr, A., D. Simpson, and L. Seeber, Case Histories of Induced and Triggered Seismicity, in Lee, W., et. al., eds., International Handbook of Earthquake and Engineering Seismology, Part A: 2002, Academic Press.

Siskind, D., et al., Structure Response and Damage Produced by Ground Vibration From Surface Mine Blasting, Report of Investigations 8507, 1980, U.S. Bureau of Mines.

Stupazzini, M., Study of Rotational Ground Motion in the Near-Field Region: in Lee, W., et. al, editors, Rotational Seismology and Engineering Applications, 2009, Bulletin of the Seismological Society of America, 2009. vol. 99, No. 2B supplement, pp. 1271-1286.

Takeo, M., Ground rotational motions recorded in near-source region of earthquakes, 1998, Geophysical Research Letters, vol. 25, No. 6, pp. 789-792, March.

Teasdale, D., et al., Response of Test House to Vibroseis Vibrations and Environmental Forces, 2005, published in GeoFrontiers 5, American Society of Civil Engineers.

Trifunac, M., Measurement of rotations—condition sine qua non—for comprehensive interpretation of strong motion, 2006, pdf file.

Trifunac, M., Review: Rotations in Structural Response: in Lee, W., et. al, editors, Rotational Seismology and Engineering Applications, 2009, Bulletin of the Seismological Society of America, vol. 99, No. 2B supplement, pp. 968-979.

Weijers, L., Advanced Fracture Methods and Mapping, 2005, Soc. Petroleum Engineers training course.

* cited by examiner

METHOD AND APPARATUS FOR ENHANCED MONITORING OF INDUCED SEISMICITY AND VIBRATION USING LINEAR LOW FREQUENCY AND ROTATIONAL SENSORS

CROSS REFERENCE TO RELATED APPLICATIONS

This application claims the benefit under 35 USC §119 (e) of U.S. Provisional Patent Application No. 61/859,277 filed on Jul. 28, 2013, the disclosure of which is incorporated herein by reference.

FIELD

The present invention pertains to the art of monitoring for risk and damage due to induced seismicity during hydraulic fracturing, during injection into waste disposal wells, during Vibroseis® seismic source operations, or during other industrial vibrational activity. More specifically, the present invention pertains to use of combinations of linear sensors and rotational sensors deployed in arrays, and the analysis of data therefrom.

BACKGROUND

Recently there has been increasing concern about the risk of damage from induced seismicity due to hydraulic fracturing and waste injection wells. For many years it has been recognized that human activities can induce seismic events; see, for example, McGarr, A., D. Simpson, and L. Seeber, 2002, "Case Histories of Induced and Triggered Seismicity", in Lee, W., et al., eds., "International Handbook of Earthquake and Engineering Seismology, Part A": Academic Press. There has been some documented damage due to induced seismicity from waste injection wells. Micro-seismic events due to hydro-fracturing have been perceptible on the surface. For some recent examples of induced seismicity associated with waste injection in Arkansas see Horton, S., "Disposal of Hydrofracking Waste Fluid by Injection into Subsurface Aquifers Triggers Earthquake Swarm in Central Arkansas with Potential for Damaging Earthquakes": Seismological Research Letters, vol. 83, no. 2, March/April, 2012, (Holland, 2013). For hydraulic fracturing in Oklahoma see Holland, A., "Earthquakes triggered by Hydraulic Fracturing in South-Central Oklahoma": Bulletin of the Seismological Society of America, vol. 103, no. 3, pp. 1784-1792, June, 2013. For hydraulic fracturing in British Columbia see Eaton, D., et al., "Broadband microseismic observations from a Montney hydraulic treatment, northeastern B.C., Canada": CSEG Recorder, March, 2013, pp. 44-53. Hydraulic fracturing of shales has become a widespread practice.

In addition to the widespread activity in hydraulic-fracturing of oil and gas reservoirs, there is a long-standing technology for monitoring possible damage during the acquisition of reflection seismic surveys in the oil and gas industry, particularly when using Vibroseis® as the source. These monitoring surveys have typically been concerned with peak particle velocity within selected frequency bandwidths, and sometimes with peak air-borne sound pressure levels. See Alcudia, A., et al., "Vibration and air pressure monitoring of seismic sources": CREWES Research Report, Volume 19, 2007, University of Calgary. See also Teasdale, D., et al., "Response of Test House to Vibroseis® Vibrations and Environmental Forces", published in GeoFrontiers 5, 2005, American Society of Civil Engineers. The prior art of monitoring Vibroseis® seismic surveys has not incorporated measurements of rotational motion to date.

There is a long standing practice of industrial vibration monitoring for activities such as quarry blasts, and construction/demolition.

Techniques for 3D and 4D seismic surveys of oil and gas fields sometimes utilize permanent deployments of 3 Component linear sensors and pressure sensors in arrays of shallow monitoring wells.

It is well understood in many fields of physical science and engineering that a complete representation of mechanical motion requires the measurement of six degrees-of-freedom. Typically this is accomplished by measuring three orthogonal linear motions, and measuring rotations around three orthogonal axes.

There is a well-established technology for measurement of the linear particle motion of seismic wavefields in the earth. Many commercial sensors exist to measure particle velocity or particle acceleration along one, or up to three, linear axes, utilizing various physical concepts to accomplish the measurements. It is most common to utilize measurements of the vertical particle motion.

There is an evolving commercial technology for measurement of the rotational particle motion of seismic wavefields in the earth. Early technology is represented by, for example, U.S. Pat. No. 2,657,373, to Piety entitled "Apparatus for Seismic Exploration". See also U.S. Pat. No. 3,407,305, to Sterry entitled "Optical Rotational Seismometer". See further U.S. Pat. No. 4,603,407 to Cowles entitled "Rotational Geophone". Newer technology is represented by, for example, sensors such as those commercially offered by MetTech (model Metr-3) and Eentec (models R-1 and R-2). U.S. Pat. No. 7,516,660 to Kozlov entitled "Convective Accelerometer" describes MetTech sensor technology. U.S. Pat. No. 7,474,591 to Menard et al. entitled "Six-Component Seismic Data Acquisition System" describes technology to measure rotational data from differences of linear data.

The utility of rotational seismic measurements is appreciated in earthquake and regional crustal seismology, as discussed, for example, in Lee, W., M. Celebi, M. Todorovska, and H. Igel, guest editors, "Rotational Seismology and Engineering Applications": Bulletin of the Seismological Society of America, vol. 99, no. 2B supplement, 2009. Further, this reference notes that rotational motion is much stronger, in at least some cases, than previously understood, and is potentially a more significant factor in damage.

Persons having skill in the art recognize that the present status of the art of seismic monitoring for risk/damage incorporates several factors, including:

An increasing need to monitor induced seismicity for increasing hydro-fracturing and waste injection well activity by use of techniques that are sensitive to all possible damage modes.

Earthquake seismology has shown that rotational energy, recorded in a few cases to date, has energy up to orders of magnitude larger than expected from standard kinematic numerical models of source mechanisms, and thus may be more important for risk/damage assessments.

Thus, there is an unmet need to record and analyze rotational seismic data sets associated with hydraulic-fracturing, associated with waste injection wells, and also associated with Vibroseis® seismic source operations.

SUMMARY

In one embodiment there is provided a method for enhancing the monitoring of induced seismicity or Vibroseis® activity, comprising: recording linear and rotational data from a plurality of sensors deployed near the activity to be monitored and analyzing combinations of the linear and rotational data jointly such as to assess the risk of damage due to induced seismicity or Vibroseis® activity.

In another embodiment there is provided an apparatus to enhance the monitoring of induced seismicity or Vibroseis® activity, comprising: at least one linear sensor and at least one rotational sensor suitable for deployment near the activity to be monitored; recording equipment to record linear and rotational data from said sensors and computing hardware and software suitable for analyzing combinations of linear and rotational data jointly such as to assess the risk of damage due to induced seismicity or Vibroseis® activity.

In yet another embodiment there is provided a system for recording the linear and rotational data from one or more linear sensors and one or more rotational sensors deployed near the activity to be monitored, and analyzing combinations of the linear and rotational data such as to assess the risk of damage due to induced seismicity or Vibroseis® activity.

Further embodiments are disclosed herein or will become apparent to those skilled in the art after having read and understood the specification and drawings hereof. This summary may be more fully appreciated with respect to the following description and accompanying figures and attachments.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTION OF SOME EMBODIMENTS

Figure 1:
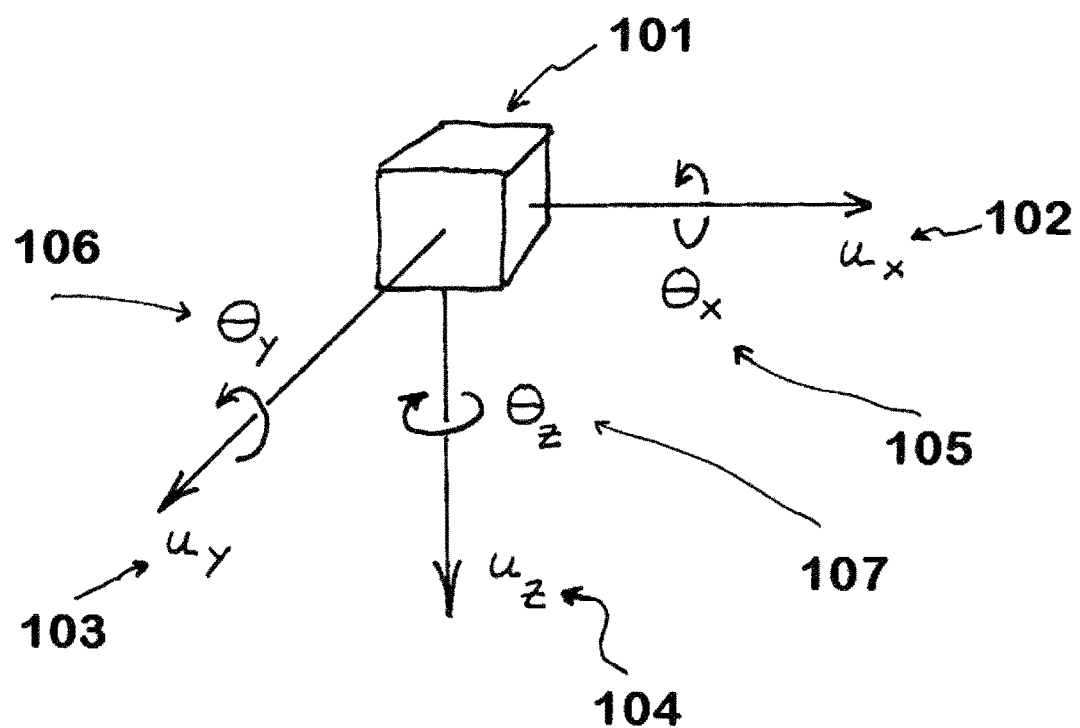
FIG. 1 is a diagrammatic view of the linear motion and rotational motion of a representative elemental volume of the earth.

Before proceeding with the detailed description, it is to be appreciated that the present teaching is by way of example only, not by limitation.

In the following description, specific details are provided to impart a thorough understanding of the various embodiments of the invention. Upon having read and understood the specification, claims and drawings hereof, however, those skilled in the art will understand that some embodiments of the invention may be practiced without adhering to some of the specific details set forth herein. Moreover, to avoid obscuring the invention, some well-known methods, processes and devices and systems finding application in the various embodiments described herein are not disclosed in detail. Persons having ordinary skill in the art will recognize that there may be many implementation-specific details that are not described here, but that would be considered part of a routine undertaking to implement the inventive concepts of the present invention.

Several embodiments of the present invention are discussed below. The appended drawings illustrate only typical embodiments of the present invention and therefore are not to be considered limiting of its scope and breadth. In the drawings, some, but not all, possible embodiments are illustrated, and further may not be shown to scale.

The object of the present invention is to provide an enhanced means to monitor man-made seismic motions by use of a combination of measurements including rotational motion. The object is further to provide a complete set of sensitive measurements that can indicate safe vibrational levels and/or document the complete seismic or vibrational motion in the event of any damage.

The particle motion of a representative elemental volume 101 of the earth is as depicted in FIG. 1. A Cartesian coordinate system is utilized, but those skilled in the art will recognize that alternate coordinate systems may be utilized. The complete particle motion is comprised of three linear motions, 102-104, and three rotational motions, 105-107. A right-hand rule for axes and rotation sign conventions is used herein.

Rotational seismic data measured by rotational seismic motion sensors may be directly related to the vector curl of the displacement wavefield, u, often with a factor of ½. Alternatively, measurements may be made of the time derivative of this rotational displacement which is angular velocity, also known as the angular rate, as is done in some commercially available rotational seismic sensors; or of the second time derivative of this rotational displacement which is angular acceleration. It will be understood by those skilled in the art after reading this description that the use of various time derivatives does not affect the present invention so long as the appropriate time derivatives are consistently utilized for combinations of measurements, or for comparisons such as against limits for allowable motion.

Within the last decade there has been a growing interest in rotational seismology within the earthquake seismology community. See, for example Lee, W., H. Igel, and M. Trifunac, "Recent Advances in Rotational Seismology": Seismological Research Letters, vol. 80, no. 3, pp. 479-490, May/June 2009. Early numerical simulations such as Bouchon, M., and K. Aki, "Strain, Tilt, and Rotation Associated with Strong Ground Motion in the Vicinity of Earthquake Faults": Bulletin of the Seismological Society of America, vol. 72, no. 5, pp. 1717-1738, October 1982, indicated that rotational motions were expected to be relatively small, and that most damage was expected to come from translational linear motions. Their analysis is based on fault planes that are large (e.g., 30 km.) compared to wavelengths and large compared to some observational distances. They note: "We also assumed that the slip and rupture velocity are uniform over the entire fault plane."

However, with the more recent development of effective rotational sensors, measured values of rotation from earthquakes have been found to be much larger than anticipated. See Bouchon, M., and K. Aki, "Strain, Tilt, and Rotation Associated with Strong Ground Motion in the Vicinity of Earthquake Faults": Bulletin of the Seismological Society of America, vol. 72, no. 5, pp. 1717-1738, October 1982. See also Takeo, M., "Ground rotational motions recorded in near-source region of earthquakes": Geophysical Research Letters, vol. 25, no. 6, pp. 789-792, March 1998, which represents some of the pioneering work in this respect.

Note some recent summaries:

"Observations in Japan and Taiwan showed that the amplitudes of rotations can be one to two orders of magnitude greater than expected from classical elasticity theory . . . " in Lee, W., H. Igel, and M. Trifunac, "Recent Advances in Rotational Seismology": Seismological Research Letters, vol. 80, no. 3, pp. 479-490, May/June 2009.

"The rotational motion amplitudes were expected to be small even in the vicinity of faults (Bouchon and Aki, 1982) whereas there is growing evidence that these amplitudes have been underestimated [in numerical models]" in Igel, "Ground rotations: what do they tell us, that we did not know before?": European Seismological Commission meeting, Montpellier, France, 6-10 Sep. 2010.

It has long been recognized that rotational motions are a significant part of earthquake damage. See Kozak, J., "Tutorial on Earthquake Rotational Effects: Historical Examples": in Lee, W., et al., editors, "Rotational Seismology and Engineering Applications": Bulletin of the Seismological Society of America, vol. 99, no. 2B supplement, 2009. It is also recognized that rotational motions play a significant role in structural dynamics. See Trifunac, M., "Review: Rotations in Structural Response": in Lee, W., et al., editors, "Rotational Seismology and Engineering Applications": Bulletin of the Seismological Society of America, vol. 99, no. 2B supplement, pp. 968-979, 2009.

It is generally understood that measurement of rotational motion is a critical element in comprehensive earthquake engineering. See Trifunac, M., "Measurement of rotations—condition sine qua non—for comprehensive interpretation of strong motion", 2006. In fact, some authors have found rotational measurements to be so important as to attempt to synthesize rotational estimates from linear motions; see, for example, Stupazzini, M., "Study of Rotational Ground Motion in the Near-Field Region": in Lee, W., et al., editors, "Rotational Seismology and Engineering Applications": Bulletin of the Seismological Society of America, vol. 99, no. 2B supplement, pp. 1271-1286, 2009.

The geophysical monitoring of hydraulic fracturing in oil and gas reservoir development has been in increasingly common commercial practice for about a decade for purposes such as mapping the Stimulated Rock Volume. Initially this typically utilized 3-Component linear geophones in deep monitoring wells adjacent to the well that is being fractured, and/or arrays of tilt meters deployed in a grid of shallow (a few meters) holes on the surface; see, for example, Weijers, L., Advanced Fracture Methods and Mapping, Soc. Petroleum Engineers training course, 2005. Additionally, and more recently, much microseismic monitoring is done with arrays of particle motion sensors on the surface of the earth; see, for example, Duncan, P. and L. Eisner, "Reservoir characterization using surface microseismic monitoring": Geophysics, vol. 75, no. 5, pp. 75A139-75A146, 2010. Various technological enhancements have been undertaken in micro-seismic data analysis, but measurement of rotational motion has not been employed in prior art practice.

It is commonly accepted that many micro-seismic events are effectively small double-couple source mechanisms, depending on pre-existing stress regimes, geology, etc. These double couple mechanisms include significant rotational motion around a vertical axis.

Rotational sensors with very low noise levels are required to sense the signals involved, for example as low as 10-7 radians/sec at frequencies in the range of, for example, a few Hz to 100 Hz.

Recently, compact high performance angular sensors with sufficient sensitivity for use in rotational seismic sensing have become available, such as from MetTech, Inc.

Low frequency recording to below 1 Hz. by means of technology such as electrokinetic sensors for both 3-C linear and 3-Theta rotational seismic data allows for an assessment of possible hydraulic-fracturing aspects such as magnitude saturation and Long Period Long Duration slip type events.

The present inventive use of low frequency linear and rotational sensors will enable the avoidance of the concept of magnitude saturation which can otherwise cause an underestimate of seismic magnitude for larger events. See Baig, A., T. Urbancic, and G. Viegas, "Do Hydraulic Fractures Induce Events Large Enough to be Felt on Surface?", Canadian Society of Exploration Geophysicists (CSEG) Recorder, October, 2012, pp. 41-46.

Further, the inventive use of linear and rotational low frequency sensors below 1 Hz enables measurements that are appropriate to detect and monitor Long Period Long Duration events (LPLD). Characteristics of LPLD seismic events are discussed in Das, I., and M. Zoback, "Long-period, long-duration seismic events during hydraulic fracture stimulation of a shale gas reservoir": The Leading Edge, July, 2011, pp. 778-786. See also Das, I. and M. Zoback, Microearthquakes Associated with Long Period, Long Duration Seismic Events During Stimulation of a Shale Gas Reservoir: presented at Society of Exploration Geophysicists annual meeting, Las Vegas, 4-9 Nov., 2012. See further Eaton, D., et al., 2013, "Broadband microseismic observations from a Montney hydraulic treatment, northeastern B.C., Canada": CSEG Recorder, March, 2013, pp. 44-53.

Figure 2A:
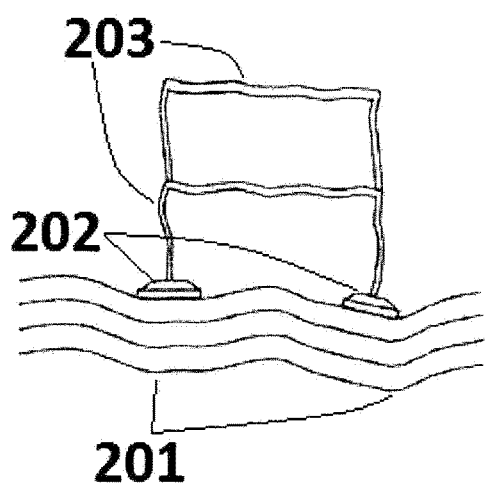
FIG. 2A is a diagrammatic view of the response of structures to rotational seismic motion for horizontal seismic wavelengths that are relatively short compared to the horizontal dimensions of man-made structures.

FIG. 2 diagrammatically (after Guidotti, R., "Near Field Earthquake Ground Motion Rotations and Relevance on Civil Engineering Structures", Doctoral Dissertation, 2012, Politecnico di Milano) depicts the rotational motion of structures in response to rotational seismic motion at the surface of the earth. FIG. 2A depicts a case for horizontal seismic wavelengths 201 that are relatively short compared to the horizontal dimensions of man-made structures. Diagrammatically, two surface contact points 202 characterize the horizontal dimension of the structure. These two contact points 202 can have different rotations, or tilts, around horizontal axes. The structure can be subject [to] relatively short wavelength rotations or distortions 203.

Figure 2B:
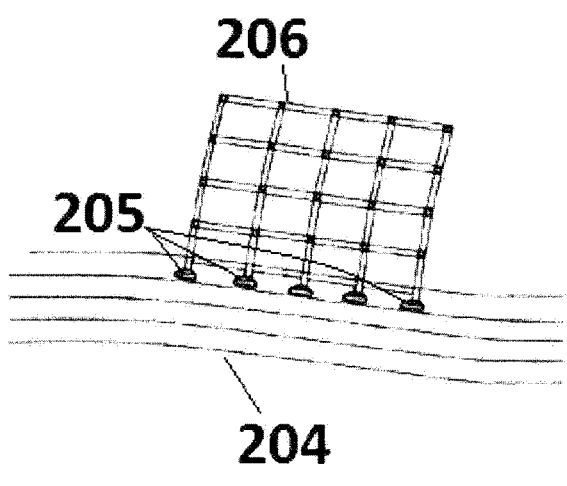
FIG. 2B is a diagrammatic view of the response of structures to rotational seismic motion where the seismic wavelengths are long compared to the dimension of the structure and FIG. 3 is a diagrammatic view of a seismic double couple source mechanism proximate a well.

FIG. 2B depicts a case where the seismic wavelengths 204 are long compared to the dimension of the structure. Each of the contact points 205 of the structure with the earth can have generally similar rotations or tilts. The structure 206 can have generally the same rotation or tilt overall.

Figure 3:
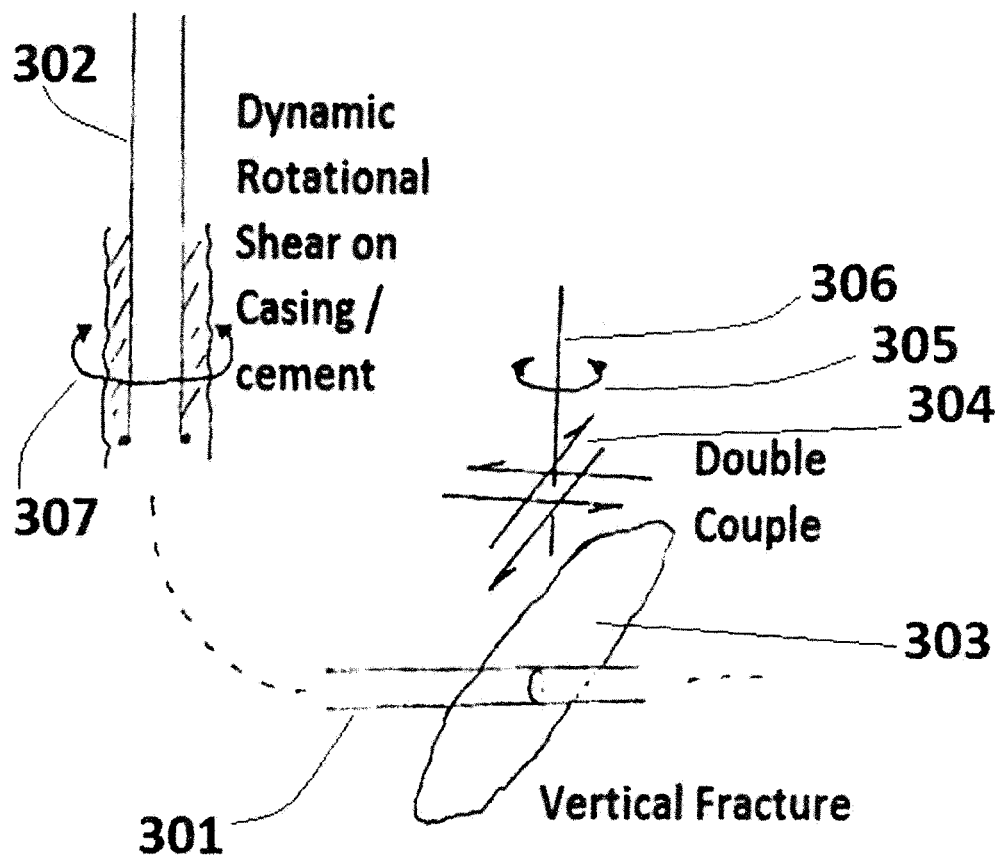

FIG. 3 diagrammatically depicts hydraulic fracturing associated with a horizontal well 301 which is deviated from a vertical well 302. A vertical fracture 303 is shown that results from hydraulic fracturing. In this case, a double couple seismic source mechanism 304 is depicted which has rotational motion 305 around a vertical axis 306. The propagation of rotational motion can also cause rotational motion around a vertical axis 307 to be experienced at the toe of the vertical well casing. This potentially can cause rotational shear stresses on the bond between the well casing and cement.

The deployment of the rotational and linear sensors in an array of shallow monitoring wells also often has additional advantages. Deployment in shallow monitoring wells can lower the seismic noise levels below those experienced at the free surface. Also, deployment in shallow monitoring wells below the water table can allow for the more effective use of additional sensors to measure pressure.

Deployment of rotational and linear sensors in shallow monitoring wells may often be advantageously done with sensors at several depth levels. Deployment of sensors at multiple levels allows for additional processing of the data. For example, compressional vs. shear waves may be separated; and upgoing vs. downgoing waves may be separated by well-known techniques such as those commonly commercially used in Vertical Seismic Profiles, or as described, for example, in U.S. Pat. No. 4,446,541 to Cowles entitled "Rotational Geophone".

There may be an array of shallow monitoring wells spaced more or less regularly at intervals on the order of several hundred meters horizontally apart, covering an area that extends horizontally a distance that is the same order of magnitude as the depths of interest for the reservoir or geologic target to be monitored. The shallow monitoring wells may typically be of a depth of at least a few meters, up to a depth of a few hundred meters. The shallow monitoring wells may typically be filled with sand, drill cuttings, and/or small gravel; and be saturated with brine or water. Such a deployment is considered permanent, and may be used for multiple purposes, including 3D and 4D seismic with active seismic sources; passive monitoring of hydrofracturing of oil and gas wells; and/or passive monitoring of fluid flow in reservoirs.

In another embodiment, sensors may be deployed in brine or water filled shallow monitoring wells, and coupled to the wall of these shallow wells with temporarily deployable locking arms. Such a deployment is typically intended to be retrievable and is considered non-permanent.

In another embodiment the deployment of the shallow monitoring wells will utilize a geometry suitable for determination of double couple shear seismic source mechanism as is commonly understood in earthquake seismology. This geometry shall include shallow monitoring wells at various azimuths, and may include relatively longer horizontal distances from the reservoir zone of interest.

This embodiment may ideally benefit from detection and separation of both compressional and shear waves at all azimuths horizontally from the geologic target of interest, such as to enhance the determination of any radiation patterns.

In some embodiments, the measurement and analysis of combined rotational and linear motion can be used to provide an overall assessment level of seismic motion. If this assessment level is below certain low level criteria, then this procedure can be used to provide a "green light" indication that motion from operations causing induced seismicity or industrial vibration has lesser risk of damage, and thus operations can continue with high levels of assurance of low risk of damage.

In some embodiments, if this assessment level is above certain high level criteria, then this procedure can be used to provide a "red light" indication that motion from operations causing induced seismicity or industrial vibration has greater risk of damage, and thus those operations should be stopped pending remedial actions.

Various limits for linear motion have been long established; see, for example, Siskind, D., et al., 1980, "Structure Response and Damage Produced by Ground Vibration From Surface Mine Blasting", Report of Investigations 8507, U.S. Bureau of Mines. It is understood, particularly for low frequencies, that limits may be imposed on linear displacement and/or on linear particle velocity. In earthquake seismology, often with very low frequencies, it has also been considered that damage limits can be simply stated in terms of linear acceleration.

Limits on rotation are very much less well established and agreed. For example, in Trifunac, 2009, there is a discussion that leads to a limit of 1 milli-radian of angular displacement around a vertical axis. However, in prior art there is not any extensive correlation of measured rotational motion vs. actual damage.

In some embodiments, limits are established on rotational displacement, rotational velocity, and/or rotational acceleration, based on field experience of rotational motion and actual damage experienced.

A limited number of embodiments have been described herein. Those skilled in the art will recognize other embodiments within the scope of the claims of the present invention.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

Other aspects, advantages, and modifications will be apparent to those of ordinary skill in the art to which the claims pertain. The elements and use of the above-described embodiments can be rearranged and combined in manners other than specifically described above, with any and all permutations within the scope of the disclosure.

Although the above description includes many specific examples, they should not be construed as limiting the scope of the method, but rather as merely providing illustrations of some of the many possible embodiments of this method. The scope of the method should be determined by the appended claims and their legal equivalents, and not by the examples given.

What is claimed is:

1. A method for enhancing the monitoring of seismic motion associated with an activity in oil and gas exploration and production operations, comprising:
    deploying a plurality of sensors near the activity to be monitored, the sensors further comprising linear sensors and rotational sensors;
    measuring and recording all linear and rotational seismic motion using the deployed sensors;
    establishing criteria based upon known criteria and field experience for the level of seismic energy which has the potential to cause damage to structures; and
    evaluating combinations of the linear and rotational data jointly to assess the risk of damage due to the activity.

2. The method of claim 1 wherein the plurality of sensors further comprises at least one 3-component linear sensor and at least one rotational sensor.

3. The method of claim 1 wherein the plurality of sensors further comprises at least one 3-component linear sensor and at least one 3-component rotational sensor.

4. The method of claim 1 wherein plurality of sensors are deployed in shallow monitoring wells.

5. The method of claim 1 wherein some of the plurality of sensors are deployed in a non-permanent manner in shallow monitoring wells.

6. The method of claim 1 wherein the plurality of sensors are deployed on the surface of the earth.

7. The method of claim 1 wherein data are recorded to passively monitor the hydrofracturing of oil and gas wells.

8. The method of claim 1 wherein data are recorded to passively monitor injection into waste disposal wells.

9. The method of claim 1 wherein data are recorded to monitor seismic vibrator source activity.

10. The method of claim 1 wherein data are recorded to monitor impulse seismic source activity.

11. The method of claim 1 wherein the sensors have a low frequency response below 1 Hz.

12. The method of claim 1 wherein the combination of linear and rotational data are compared to the established criteria to provide a "green light" signal allowing the continuation of operations that potentially can induce seismicity, or a "red light" signal indicating that operations that potentially can induce seismicity should be halted, modified, or mitigated.

13. The method of claim 1 wherein the data are retained as potential evidence if damage is caused or alleged to have been caused by the activity.

14. A system to enhance the monitoring of seismic motion associated with an activity in oil and gas exploration and production operations comprising:

at least one linear sensor and at least one rotational sensor suitable for deployment near the activity to be monitored;

recording equipment to record linear and rotational seismic data from the linear and rotational sensors; and computing hardware and software suitable for evaluating combinations of linear and rotational data jointly to assess the risk of damage due to the activity.

15. The system of claim 14 wherein the combinations of linear and rotational data are compared to known criteria and field experience to provide a "green light" signal allowing the continuation of operations that potentially can induce seismicity, or a "red light" signal indicating that operations that potentially can induce seismicity should be halted, modified, or mitigated.

16. The system of claim 14 wherein the data are retained as potential evidence if damage is caused or alleged to have been caused by the activity.

17. The system of claim 14 wherein data are recorded to passively monitor the hydrofracturing of oil and gas wells.

18. The system of claim 14 wherein data are recorded to passively monitor injection into waste disposal wells.

19. The system of claim 14 wherein data are recorded to monitor seismic vibrator source activity.

20. The system of claim 14 wherein data are recorded to monitor impulse seismic source activity.

* * * * *